(12) United States Patent
Dodane

(10) Patent No.: US 6,666,132 B2
(45) Date of Patent: Dec. 23, 2003

(54) DETACHABLE DEVICE FOR GRIPPING, LIFTING, HANDLING AND TILTING COOKING UTENSILS WITH TWO HANDLES

(75) Inventor: Paul Dodane, Exincourt (FR)

(73) Assignee: DJA Dodane Jean et Associes DJA Cristel, Fesches le Chatel (FR)

(*) Notice: Subject to any disclaimer, the term of this patent is extended or adjusted under 35 U.S.C. 154(b) by 0 days.

(21) Appl. No.: 10/363,521

(22) PCT Filed: Sep. 3, 2001

(86) PCT No.: PCT/FR01/02726
§ 371 (c)(1),
(2), (4) Date: Mar. 4, 2003

(87) PCT Pub. No.: WO02/19882
PCT Pub. Date: Mar. 14, 2002

(65) Prior Publication Data
US 2003/0183088 A1 Oct. 2, 2003

(30) Foreign Application Priority Data
Sep. 4, 2000 (FR) .............................................. 00 11224

(51) Int. Cl.[7] .......................... A47J 27/00; A47J 37/00; A47J 45/06; A47J 45/10; B65D 25/28
(52) U.S. Cl. ............................. 99/403; 99/422; 16/422; 16/425; 220/759
(58) Field of Search ......................... 99/337, 338, 340, 99/339, 403–418, 422, 423–425, 444–450; 126/390.1, 373.1, 369; 220/759, 769, 770, 735, 752, 755, 912; 294/31.1, 34; 16/110.1, 111.1, 422, 425, 421, 434, 444; 30/340; 403/325; D7/357, 361, 395

(56) References Cited

U.S. PATENT DOCUMENTS

| | | | |
|---|---|---|---|
| 1,364,552 A | | 1/1921 | Hill |
| 2,106,391 A | | 1/1938 | Duraj .......................... 294/31 |
| 2,370,860 A | * | 3/1945 | Hanke ......................... 16/425 |
| 2,450,193 A | * | 9/1948 | Galliano .................... 294/27.1 |
| 3,203,029 A | * | 8/1965 | Serio ............................ 16/422 |
| 3,306,648 A | * | 2/1967 | Serio ......................... 294/27.1 |
| 3,438,082 A | * | 4/1969 | Jones et al. ................. 220/759 |
| 4,206,853 A | | 6/1980 | Iten et al. |
| 4,965,907 A | * | 10/1990 | Baumgarten ................ 220/759 |
| 5,373,608 A | * | 12/1994 | Welch ......................... 16/425 |
| 5,673,458 A | * | 10/1997 | Raoult ......................... 16/425 |
| 5,704,092 A | * | 1/1998 | Nicollet et al. .............. 16/425 |
| 5,802,960 A | * | 9/1998 | Graj et al. .................... 99/403 |
| 6,237,471 B1 | * | 5/2001 | Nam ............................ 99/422 |
| 6,298,775 B1 | * | 10/2001 | Chen ........................... 99/422 |
| 6,393,973 B1 | * | 5/2002 | Velo et al. .................... 99/422 |

FOREIGN PATENT DOCUMENTS

FR   1.361.405   4/1963

OTHER PUBLICATIONS

International Search Report, in French, dated Nov. 16, 2001.
International Preliminary Examination Report, in French, dated Jan. 24, 2002.

* cited by examiner

Primary Examiner—Timothy F. Simone
(74) Attorney, Agent, or Firm—Cohen, Pontani, Lieberman & Pavane

(57) ABSTRACT

The removable device for taking hold of, lifting, handling, and pouring from cooking utensils having two diametrically opposite outwardly-directed handles in the form of lugs (2), each of which has an opening (5) that is substantially parallel to the inner edge (6) of said lug (2), is characterized by the fact that it comprises a pair of removable shells (10) suitable for fitting over said lugs (2) and made of a thermally insulating material, each shell (10) presenting an internal cavity (11), which opens out laterally through an oblong orifice (13), which is suitable for receiving a lug (2) inserted through said orifice (13), and which is fitted with an internal locking/unlocking device (20) suitable for co-operating with the opening (5) in the lug (2) when received in said cavity (11).

9 Claims, 3 Drawing Sheets

DETACHABLE DEVICE FOR GRIPPING, LIFTING, HANDLING AND TILTING COOKING UTENSILS WITH TWO HANDLES

PRIORITY CLAIM

This is a U.S. national stage of application No. PCT/FR01/02726, filed on Sep. 3, 2001. Priority is claimed on that application and on the following application: Country: France, Application No.: 0011224, Filed: Sep. 4, 2000.

BACKGROUND OF THE INVENTION

The invention relates to a removable device for taking hold of, lifting, handling, and pouring from cooking utensils having two diametrically opposite outwardly-directed handles in the form of lugs, each of which has an opening that is substantially parallel to the inner edge of said lug.

The opening in a lug is designed to co-operate with a dual-slope catch of a removable handle in the form of a stick that also includes a hook for co-operating with the rim of the lug. The utensil can then be used as a pan having a removable handle. The other lug then serves no function.

The utensil can also be used as a two-handled pot for cooking food on a fire or in an oven. Since both handles are made of metal, they can lead to serious burning if the hot utensil is grasped or lifted using bare hands. The use of a removable handle for lifting a hot cooking utensil can also be dangerous if the utensil contains a large quantity of food, since the torque to be exerted on the handle can then be greater than the maximum amount of torque that some people can produce.

That is why it can be useful to be able to take hold of both lugs in both hands without getting burnt. This is usually done with thermally insulating, "oven" gloves.

FR A 2 416 677 proposes lugs including easily removable knobs that are thermally insulating for the purpose of handling cooking utensils. The lugs proposed present a profile of width that increases going outwards, and the knobs include grooves of corresponding profile, these grooves and the associated portion of each lug occupying a circular arc in a longitudinal direction, and preferably in a horizontal plane of the object. The grooves in the knobs and the portions of the lugs that co-operate therewith are preferably of dovetailed shape. In that document, no provision is made to lock the knobs on the lugs, and said lugs cannot be used to engage removable handles.

SUMMARY OF THE INVENTION

The object of the invention is to propose a device enabling the hands of a user taking hold of or lifting a hot cooking utensil by means of its lugs to be protected effectively and safely.

The invention achieves this object by the fact that the device comprises a pair of removable shells suitable for fitting over said lugs and made of a thermally insulating material, each shell presenting an internal cavity, which opens out laterally through an oblong orifice, which is suitable for receiving a lug inserted through said orifice, and which is fitted with an internal locking/unlocking device suitable for co-operating with the opening in the lug when received in said cavity.

Advantageously, the locking/unlocking device comprises a plate mounted to tilt about a pivot shaft extending parallel to the oblong orifice and received in a clearance chamber formed inside the corresponding shell and adapted to enable the plate to tilt between a locking position and an unlocking position, one of the ends of said plate having a projecting catch suitable for being received in the opening of the lug on which the corresponding shell is engaged when said plate is in its locking position, and the other end of said plate being accessible to the user to enable the user to tilt said plate into its unlocking position so as to retract said catch by exerting manual pressure on said other end against torque exerted by resilient means tending to tilt said plate towards its locking position.

Preferably, the clearance chamber for the plate comprises a front zone opening out above the middle portion of the cavity, and a rear zone opening out into a through orifice formed in the corresponding shell substantially perpendicularly to the plate, and in which the other end of the plate that is remote from the source of heat is engaged, said other end being controllable through the orifice and not projecting in any way from the shell.

Advantageously, the resilient means comprise a spring bearing against the plate and bearing against the end wall of a housing opening out into the front zone of the clearance chamber for the plate.

Preferably, the catch is disposed in the middle portion of the oblong orifice in the locking position of the plate. On its front face, the catch has a chamfer which enables said catch to be retracted while the shell is being put into place on the lug

BRIEF DESCRIPTION OF THE DRAWINGS

Other advantages and characteristics of the invention appear on reading the following description given by way of example and with reference to the accompanying drawings, in which.

DETAILED DESCRIPTION OF THE PRESENTLY PREFERRED EMBODIMENTS

Figure 1:
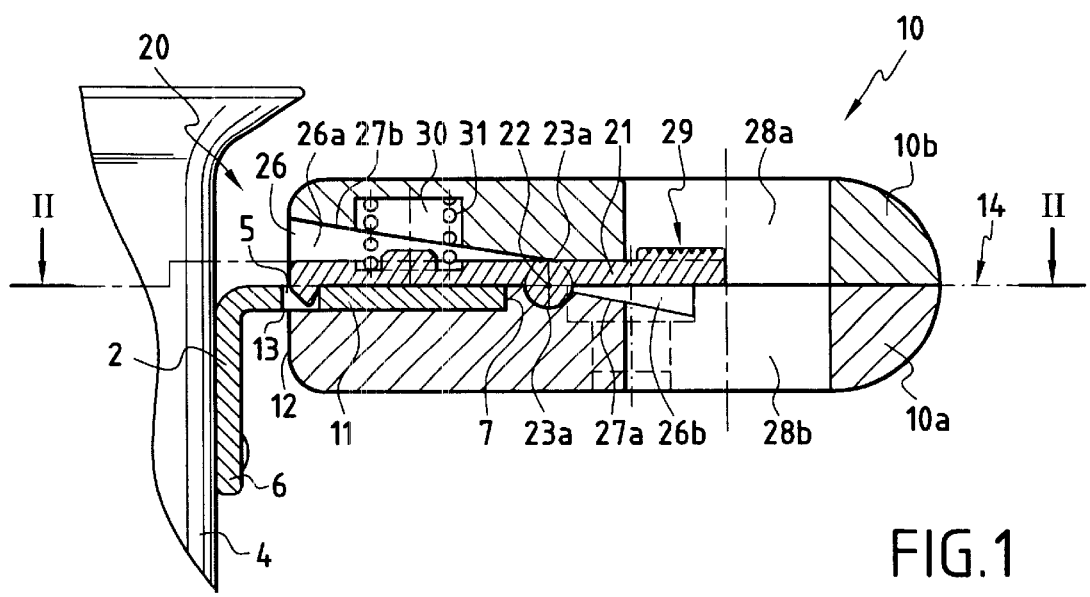
FIG. 1 is a longitudinal section on a vertical plane of symmetry through a shell of the device of the invention in its locked position on a lug of a cooking utensil.
Figure 2:
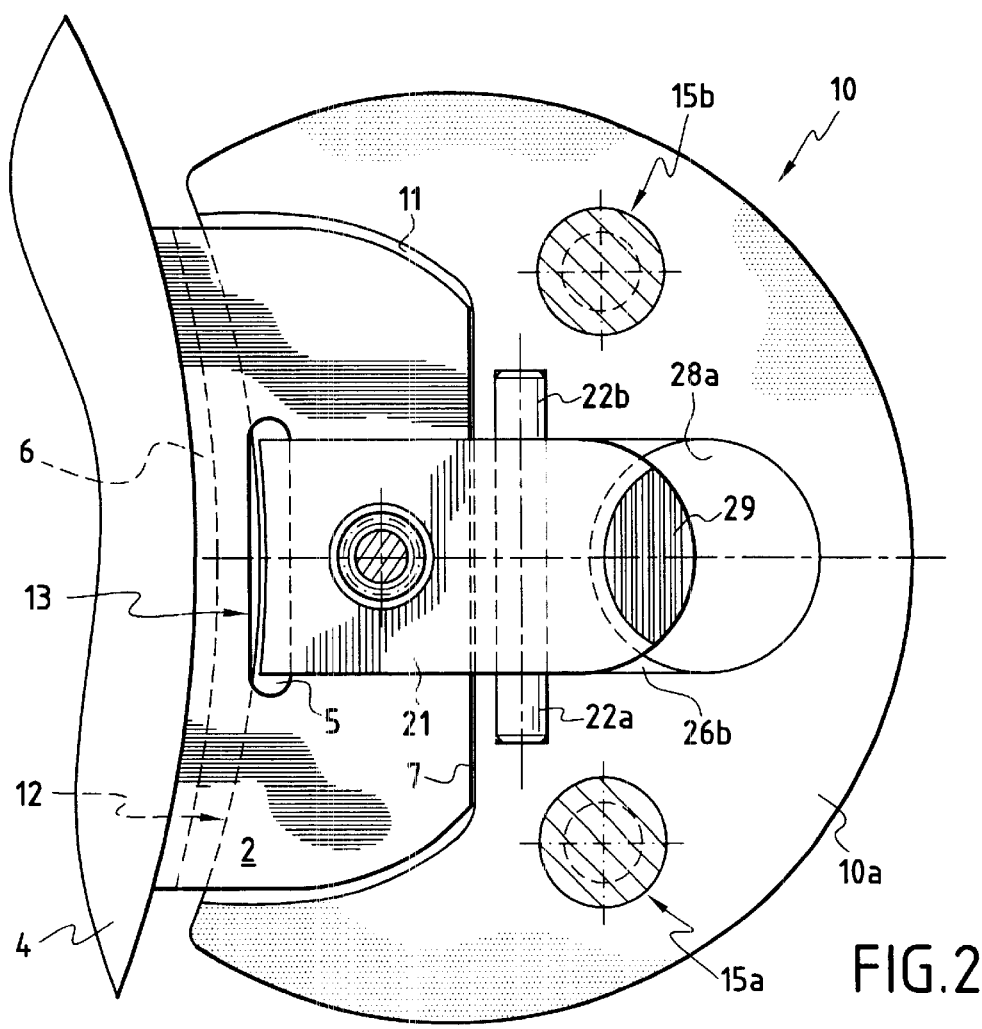
FIG. 2 is a section on a horizontal plane on line II—II of FIG. 1.
Figure 3:
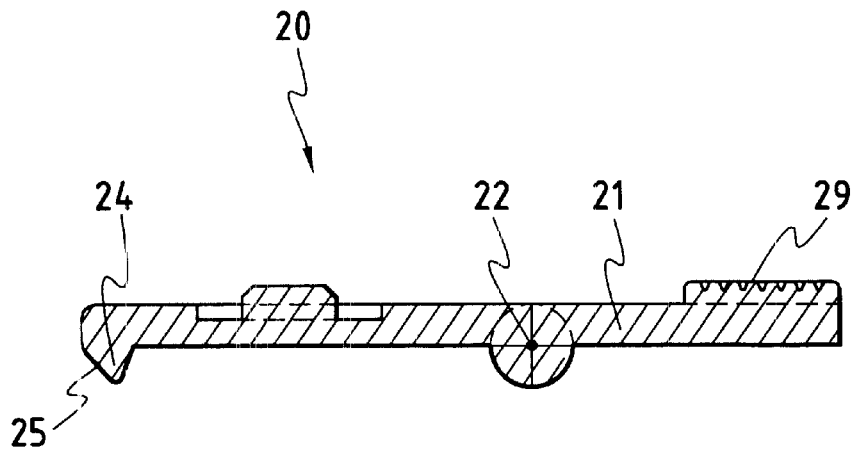
FIG. 3 is a longitudinal section on a vertical plane of symmetry through the plate of the locking/unlocking device.
Figure 4:
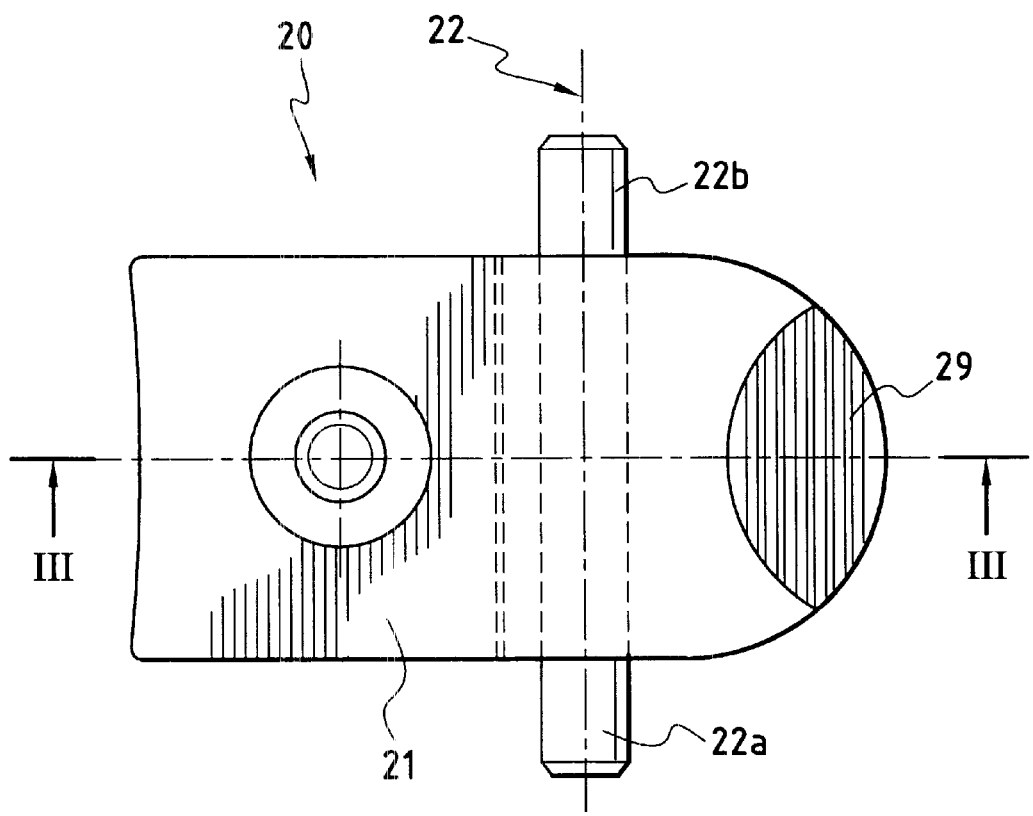
FIG. 4 is a plan view of the FIG. 3 plate.

FIGS. 1 and 2 shows a cooking utensil handle in the form of a lug 2, with only a peripheral portion 4 of the utensil being shown, said utensil having two similar lugs 2 that are diametrically opposite. Each lug 2 is made of metal and includes an opening 5 that is substantially parallel to its inner edge 6 which is fixed to the side wall of the utensil. Each lug 2 extends outwards from the utensil, substantially horizontally, and presents an outer edge 7 that is substantially parallel to the inner edge 6.

In order to able to take hold of and lift the hot cooking utensil by means of its two lugs 2, the invention provides two shells 10 made of a thermally insulating material, which shells are removable, and each of which is suitable for fitting over one of the lugs 2.

Each shell 10, which is of horizontal section and of thickness considerably greater than the horizontal section and thickness of a lug 2, includes an internal cavity 11 that opens out via an oblong orifice 13 in the front side face 12 of the shell 10, which face is directed in use towards the inner edge 6 of the lug 2. The dimensions of the internal cavity 11 are such that when the lug 2 is inserted therein via the oblong orifice 13, the lug 2 is received without significant play inside the cavity 11, and over the greatest extent thereof, so as to provide effective protection for the hands of a user lifting the cooking utensil by means of the shells 10 fitted over the lugs 2. In this normal use position, the opening 5 is likewise almost completely received inside the cavity 11.

Figure 5:
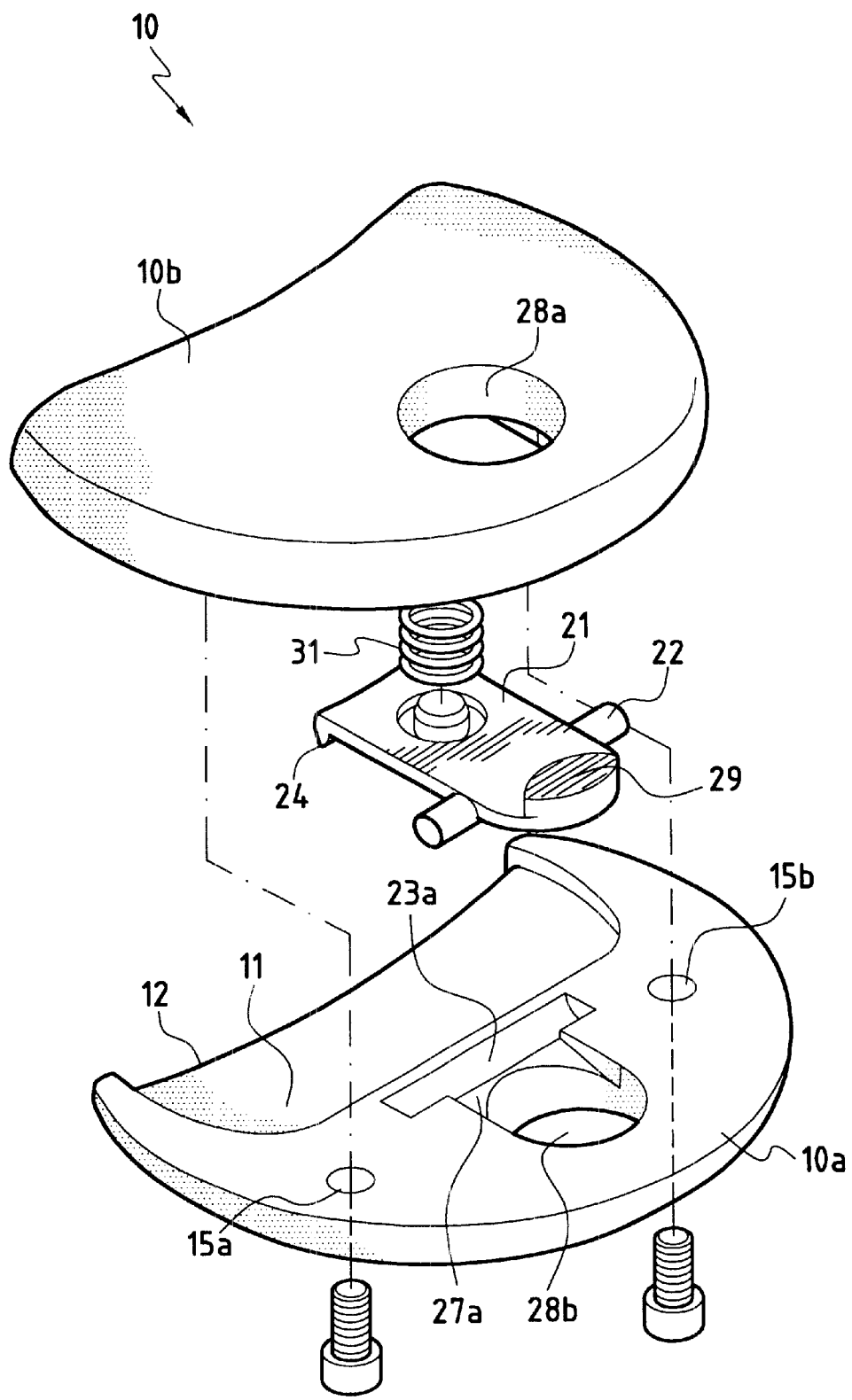
FIG. 5 is an exploded view of a shell of the device of the invention.

The shell 10 is made of two parts that meet in a substantially middle horizontal join plane 14 which contains the top wall defining the internal cavity 11. As can be seen in FIG. 5, the shell 10 is made by assembling together a bottom shell 10a in which the cavity 11 is formed, and a top shell 10b. The bottom shell presents through holes 15a and 15b for passing fixing screws, the threads of these screws co-operating with tapping formed in the top shell 1ob.

In its thickness, the shell 10 also includes a locking/unlocking device 20. This device essentially comprises a rigid plate 21 secured to a transverse pivot shaft 22 whose ends 22a and 22b project laterally from the rigid plate 21 so as to constitute pivot bearings.

The transverse pivot shaft 22 is received in two semicylindrical grooves 23a facing each other in the shells 10a and 10b and opening out into the join plane 14. Only the groove 23a of the bottom shell 10a can be seen in FIG. 5. When the two shells 10a and 10b are assembled together, the two semicylindrical grooves together constitute the housing for the pivot shaft 22 which is then parallel to the oblong orifice 13. As can be seen in FIGS. 1 and 5, the groove 23a is disposed behind the cavity 11, where "front" and "rear" are defined relative to the front side face 12 directed towards the cooking utensil.

At its front end, the plate 21 has a downwardly curved catch 24, which presents a chamfer 25 on its front face. The catch 24 serves to penetrate into the opening 5 of the lug 2 when the shell 10 is fitted onto said lug 2.

In order to enable the plate 21 to pivot on its transverse pivot shaft 22, a clearance chamber 26 is provided inside the shell 10 and receives the plate 21.

The front zone 26a of the clearance chamber 26 is formed in the top shell 10b. This front zone 26a opens out above the middle zone of the cavity 11 and it is defined in particular by two walls that diverge going away from the pivot shaft 22, one of said walls being the top face of the bottom shell 10a and the other wall 27b being formed in the top shell 10b.

The rear zone 26b of the clearance chamber is formed in the bottom shell 10a, and in the top shell 10b. It is defined by a join plane 14 and a sloping wall 27a formed in the bottom shell 10a.

The two shells 10a and 10b have facing through holes 28a and 28b in alignment into which the rear zone 26bopens out and in which the rear end 29 of the plate 21 is received.

The top shell 10b also has a housing 30 which opens out into the front zone 26a of the clearance chamber. The end wall of this housing serves as a bearing surface for one end of a compression spring 31 whose other end bears against the front top face of the plate 21.

The compression spring 31 urges the plate 21 towards the locking position. In this locking position, the catch 24 is received in the opening 5 of the lug 2, with the lug itself being received in the cavity 11. The rear end 29 constitutes a control member to enable the device 20 to be unlocked, with the user pressing on said rear end 29 of the plate 21 by inserting a thumb into the top hole 28a of the top shell 10a. The user exerts force that is sufficient to overcome the force from the compression spring 31. The plate 21 which was initially parallel to the join plane 14 tilts with the shaft 22 and comes to bear against the sloping walls 27a and 27b, the catch 24 then being retracted into the front zone 26a of the clearance chamber 26. The two shells 10 can then be withdrawn by applying a small amount of outwardly-directed radial force thereon, either on both together or on one at a time. Since the end 29 furthest away from the source of heat, even in the locked position, is situated inside the holes 28a and 28b, said end 29 does not create any obstacle for the hand which has plenty of room to act and the risk of untimely unlocking is avoided. In addition, the risk of a child unlocking the shell deliberately or accidentally is also avoided.

The shells 10 are put into place by the opposite procedure. It is entirely possible for the catch 24 to be initially retracted into the front zone 26a of the clearance chamber 26 by the thumb exerting a downwardly-directed force on the end 29. However, if the plate 21 is in its locking position prior to inserting the outer edge 7 of the lug 2 into the oblong orifice 13, then the outer edge 7 will co-operate with the chamfer 25 and cause the plate 21 to tilt so as to allow the lug 2 to be inserted into the cavity 11.

The shells 10a and 10b are made by molding a thermosetting insulating material.

A shell 10 is easy to assemble: the plate 21 is placed on the bottom shell 10a, and then the spring 31 is put into position, after which the assembly is covered with the top shell 10b and the two shells 10a and 10b are united by means of screws passing through the holes 15a and 15b.

The front zone 26a and the rear zone 26b of the clearance chamber 26 are defined going away from the pivot shaft 22 by means of surfaces 14, 27a, 27b that diverge.

The clearance chamber 26 is defined in its front zone 26a by diverging surfaces which comprise the horizontal join plane 14 and the sloping wall 27a.

Similarly, the clearance chamber 26 is defined in its rear zone 26b by diverging surfaces comprising the horizontal join plane 14 and the sloping wall 27b.

What is claimed is:

1. A removable device for taking hold of, lifting, handling, and pouring from cooking utensils having two diametrically opposite outwardly-directed handles in the form of lugs (2), each of which has an opening (5) that is substantially parallel to the inner edge (6) of said lug (2), the device being characterized by the fact that it comprises a pair of removable shells (10) suitable for fitting over said lugs (2) and made of a thermally insulating material, each shell (10) presenting an internal cavity (11), which opens out laterally through an oblong orifice (13), which is suitable for receiving a lug (2) inserted through said orifice (13), and which is fitted with an internal locking/unlocking device (20) suitable for co-operating with the opening (5) in the lug (2) when received in said cavity (11).

2. A device according to claim 1, characterized by the fact that the locking/unlocking device (20) comprises a plate (21) mounted to tilt on a pivot shaft (22) extending parallel to the oblong orifice (13) and received in a clearance chamber (26) formed inside the corresponding shell (10) and adapted to enable the plate (21) to tilt between a locking position and an unlocking position, one of the ends of said plate having a projecting catch (24) suitable for being received in the opening (5) of the lug (2) on which the corresponding shell (10) is engaged when said plate (21) is in its locking position, and the other end (29) of said plate (21) being accessible to the user to enable the user to tilt said plate (21) into its unlocking position so as to retract said catch (24) by exerting manual pressure on said other end (29) against torque exerted by resilient means (31) tending to tilt said plate (21) towards its locking position.

3. A device according to claim 2, characterized by the fact that the clearance chamber (26) for the plate (21) comprises a front zone (26*a*) opening out above the middle portion of the cavity (11), and a rear zone (26*b*) opening out into a through orifice (28*a*, 28*b*) formed in the corresponding shell (10) substantially perpendicularly to the plate (21), and in which the other end (29) of the plate (21) that is remote from the source of heat is engaged, said other end being controllable through the orifice (28*a*) and not projecting in any way from the shell (10).

4. A device according to claim 3, characterized by the fact that the pivot shaft (22) is situated behind the cavity (11) for receiving a lug (2).

5. A device according to claim 4, characterized by the fact that the front zone (26*a*) and the rear zone (26*b*) of the clearance chamber (26) are defined going away from the pivot shaft (22) by surfaces (14, 27*a*, 27*b*) that diverge.

6. A device according to claim 3, characterized by the fact that the resilient means comprise a spring (31) bearing against the plate (21) and bearing against the end wall of a housing (30) opening out into the front zone (26*a*) of the clearance chamber (26) for the plate (21).

7. A device according to claim 2, characterized by the fact that in the locking position of the plate (21), the catch (24) is disposed in the middle portion of the oblong orifice (13).

8. A device according to claim 2, characterized by the fact that the catch (24) has a chamber (25) on its front face enabling said catch (24) to be retracted while the shell (10) is being put into place on a lug (2).

9. A device according to claim 1, characterized by the fact that each shell (10) is made of two parts (10*a*, 10*b*) that meet in a join plane (14) containing the pivot shaft of the plate (21).

* * * * *